(12) United States Patent
Shingu et al.

(10) Patent No.: US 11,341,461 B2
(45) Date of Patent: May 24, 2022

(54) NOTIFICATION APPARATUS AND NON-TRANSITORY COMPUTER READABLE MEDIUM STORING PROGRAM

(71) Applicant: FUJIFILM Business Innovation Corp., Tokyo (JP)

(72) Inventors: Jun Shingu, Kanagawa (JP); Toshiro Shimada, Kanagawa (JP); Atsushi Ito, Kanagawa (JP); Shinobu Ozeki, Kanagawa (JP); Takayuki Takeuchi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 93 days.

(21) Appl. No.: 16/455,763

(22) Filed: Jun. 28, 2019

(65) Prior Publication Data
US 2020/0013019 A1 Jan. 9, 2020

(30) Foreign Application Priority Data
Jul. 6, 2018 (JP) .............................. JP2018-128749

(51) Int. Cl.
*G06Q 10/10* (2012.01)
*G06F 9/54* (2006.01)
*G06Q 10/06* (2012.01)

(52) U.S. Cl.
CPC .......... *G06Q 10/109* (2013.01); *G06F 9/542* (2013.01); *G06Q 10/063114* (2013.01)

(58) Field of Classification Search
None
See application file for complete search history.

(56) References Cited

U.S. PATENT DOCUMENTS

| 8,019,692 B2 | 9/2011 | Rosen |
| 8,990,319 B2 | 3/2015 | Wiese et al. |
| 2003/0020623 A1* | 1/2003 | Cao ........................ H04L 67/16 340/686.6 |
| 2006/0161599 A1 | 7/2006 | Rosen |
| 2008/0255919 A1* | 10/2008 | Gorder ................ G06Q 10/109 705/7.13 |
| 2008/0288355 A1 | 11/2008 | Rosen |
| 2011/0276689 A1 | 11/2011 | Rosen |
| 2011/0282750 A1 | 11/2011 | Rosen |

(Continued)

FOREIGN PATENT DOCUMENTS

| JP | 4788316 B2 * | 10/2001 |
| JP | 2004533739 | 11/2004 |

(Continued)

OTHER PUBLICATIONS

Office Action of Japan Counterpart Application, with English translation thereof, dated Mar. 29, 2022, pp. 1-5.

*Primary Examiner* — Charles E Anya
(74) *Attorney, Agent, or Firm* — JCIPRNET

(57) ABSTRACT

A notification apparatus includes a registration unit that registers plural participants for each work, a positional information acquisition unit that acquires pieces of positional information of the participants, and a notification unit that notifies at least one participant out of the participants when a positional relationship between the participants is a predetermined positional relationship based on the pieces of positional information of the participants.

13 Claims, 7 Drawing Sheets

(56) References Cited

U.S. PATENT DOCUMENTS

| | | | |
|---|---|---|---|
| 2012/0296859 A1* | 11/2012 | Haynes | G06Q 10/109 706/47 |
| 2012/0329475 A1* | 12/2012 | Ribaudo | G01S 5/0018 455/456.1 |
| 2014/0109210 A1* | 4/2014 | Borzycki | G06F 21/32 726/7 |
| 2016/0071065 A1* | 3/2016 | Ohashi | G06Q 10/1095 705/7.19 |
| 2017/0091696 A1 | 3/2017 | Funakoshi et al. | |
| 2017/0180543 A1* | 6/2017 | Wassingbo | H04W 4/025 |
| 2018/0268495 A1* | 9/2018 | O'Connor | H04L 67/10 |

FOREIGN PATENT DOCUMENTS

| | | |
|---|---|---|
| JP | 2008517402 | 5/2008 |
| JP | 2012048708 | 3/2012 |
| JP | 2015211316 | 11/2015 |
| JP | 2017069730 | 4/2017 |

\* cited by examiner

FIG. 3

| TASK ID | AUTHOR | PARTICIPANT | ESTIMATED TIME | DUE DATE | MESSAGE | STATUS |
|---|---|---|---|---|---|---|
| ... | ... | ... | ... | ... | ... | ... |
| ... | ... | ... | ... | ... | ... | ... |
| ... | ... | ... | ... | ... | ... | ... |

| USER NAME | POSITIONAL INFORMATION |
|---|---|
| ... | ... |
| ... | ... |
| ... | ... |
| ... | ... |
| ... | ... |
| ... | ... |

| AUTHOR | TB1 |
| PARTICIPANT | TB2 |
| DUE DATE | TB3 |
| ESTIMATED TIME | TB4 |
| MESSAGE FOR PARTICIPANT | TB5 |

REGISTER   CANCEL

NOTIFICATION APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-128749 filed Jul. 6, 2018.

BACKGROUND (i) Technical Field

The present disclosure relates to a notification apparatus and a non-transitory computer readable medium storing a program.

(ii) Related Art

For example, a technology disclosed in Japanese Unexamined Patent Application Publication No. 2012-48708 is provided as a technology for assisting communication. In this technology, when a first user transmits his/her status and message to a second user from a client, a client of the second user displays the status of the first user, the message input by the first user, and the position where the first user is present. In the technology of Japanese Unexamined Patent Application Publication No. 2012-48708, the first user transmits a due date, a desired communication method, and available communication methods to the second user and the second user may select a date for communication and a desired communication method in response to the transmitted information.

SUMMARY

Aspects of non-limiting embodiments of the present disclosure relate to the following circumstances. For example, if a plurality of persons intend to carry out communication that requires only a short period of time and if the persons grasp that they are located close to each other, the persons may meet promptly to carry out the communication. However, it is difficult to constantly grasp the positions of communication partners and the persons may fail to carry out communication even if they are located close to each other.

It is desirable that a plurality of persons meet directly to carry out work without presetting a meeting location.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a notification apparatus comprising a registration unit that registers a plurality of participants for each work, a positional information acquisition unit that acquires pieces of positional information of the participants, and a notification unit that notifies at least one participant out of the participants when a positional relationship between the participants is a predetermined positional relationship based on the pieces of positional information of the participants.

BRIEF DESCRIPTION OF THE DRAWINGS

An exemplary embodiment of the present disclosure will be described in detail based on the following figures, wherein:

FIG. 3 illustrates an example of a task database;

FIG. 4 illustrates an example of a position database;

FIG. 7 illustrates an example of a task creation screen;

DETAILED DESCRIPTION

Exemplary Embodiment

Overall Configuration

Figure 1:
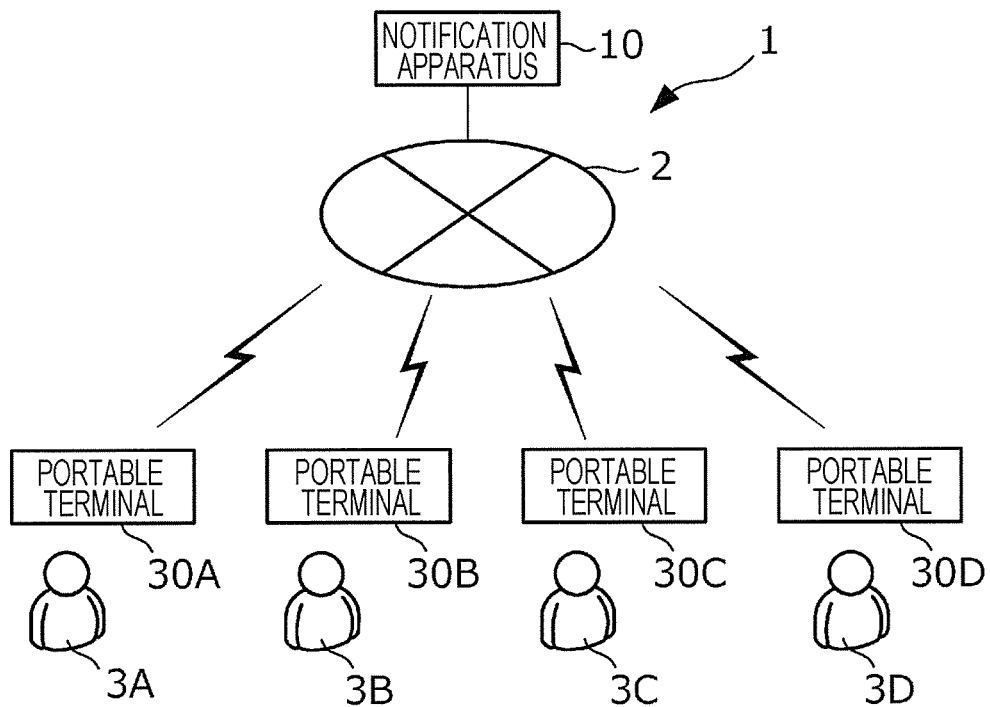
FIG. 1 illustrates apparatuses related to a notification system according to an exemplary embodiment of the present disclosure.

FIG. 1 illustrates apparatuses related to a notification system 1 according to an exemplary embodiment of the present disclosure. The notification system 1 manages tasks to be executed by a plurality of persons in an office. The task is an example of work according to the exemplary embodiment of the present disclosure. An author of the task and a participant in the task are examples of participants according to the exemplary embodiment of the present disclosure. Examples of the task include a meeting to be held by a plurality of persons, a request for work, and an exchange of articles.

A communication line 2 is a communication network for communicating data. A plurality of computers for data communication are connected to the communication line 2. The communication line 2 includes wired and wireless communication networks.

Portable terminals 30A to 30D are terminals of users 3A to 3D of the notification system 1. The user 3A has the portable terminal 30A. The user 3B has the portable terminal 30B. The user 3C has the portable terminal 30C. The user 3D has the portable terminal 30D. The portable terminals 30A to 30D have the same configuration and are therefore referred to as portable terminals 30 hereinafter unless otherwise distinguished. In this exemplary embodiment, the portable terminal 30 is a smartphone but is not limited to the smartphone and may be a tablet terminal, a feature phone, or the like. FIG. 1 illustrates the portable terminals 30A to 30D but there are as many portable terminals 30 as the users of the notification system 1. The portable terminal 30 is connected to the communication line 2 by wireless and communicates data via the communication line 2. The portable terminal 30 stores an application program for performing processing related to a task to be executed by the user (hereinafter referred to as a task application). The portable terminal 30 that has started the task application communicates with a notification apparatus 10, transmits and receives various types of information related to the task, transmits and receives notifications, and performs the processing related to the task.

The notification apparatus 10 is connected to the communication line 2. The notification apparatus 10 is an example of a notification apparatus according to the exemplary embodiment of the present disclosure. The notification apparatus 10 registers a plurality of participants in a task to be executed by a user of the notification system 1 for each task created by the user. The notification apparatus 10 acquires pieces of positional information of the plurality of users. When a positional relationship indicated by pieces of positional information of a plurality of task participants satisfies a predetermined condition, the notification apparatus 10 transmits a notification that recommends starting the task to the task participant. For example, room access information obtained by a room access control system may be used and information on the position of a room where the task participant is present may be acquired as the positional information of the participant.

Configuration of Notification Apparatus 10

Figure 2:
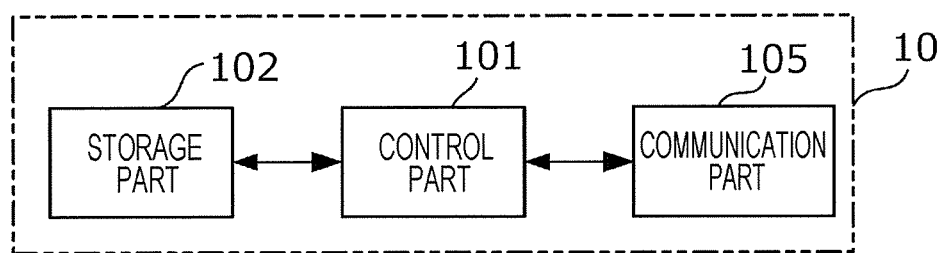
FIG. 2 illustrates the hardware configuration of a notification apparatus.

FIG. 2 is a block diagram illustrating an example of the hardware configuration of the notification apparatus 10. A communication part 105 is a communication interface for communication via the communication line 2. A storage part 102 has a storage apparatus that stores information (for example, a hard disk drive) and stores a program to be executed by a control part 101. The storage part 102 is an example of a recording unit according to the exemplary embodiment of the present disclosure. The storage part 102 stores a task database DB1 and a position database DB2.

FIG. 3 illustrates an example of the task database DB1. The task database DB1 stores pieces of information related to tasks created by the users. The task database DB1 has a task ID field, an author field, a participant field, an estimated time field, a due date field, a message field, and a status field. Task IDs are stored in the task ID field. The task ID is an identifier for identifying a task created by a user. The names of task authors are stored in the author field. The names of task participants are stored in the participant field. Estimated times from start to end of the tasks are stored in the estimated time field. Due dates for task completion are stored in the due date field. Messages from the task authors to the task participants are stored in the message field. Pieces of information indicating statuses of the tasks are stored in the status field.

FIG. 4 illustrates an example of the position database DB2. The position database DB2 stores pieces of positional information of the users in association with the user names. The names of the users of the notification system 1 are stored in a user name field. Pieces of positional information indicating the positions of the users of the notification system 1 are stored in a positional information field. For example, information indicating a room where a user is present may be acquired from the room access control system and stored in the position database DB2 as the positional information of the user.

The control part 101 includes a central processing unit (CPU), a random access memory (RAM), and a read only memory (ROM). Functions of the notification apparatus 10 are implemented such that the CPU performs arithmetic operations by reading the program (software) stored in the storage part 102 on hardware such as the CPU or the RAM to control the storage part 102, the communication part 105, and data reading and/or writing in the RAM and the storage part 102. The program stored in the ROM and executed by the CPU is an example of a program according to the exemplary embodiment of the present disclosure.

Functional Configuration of Notification Apparatus 10

Figure 5:
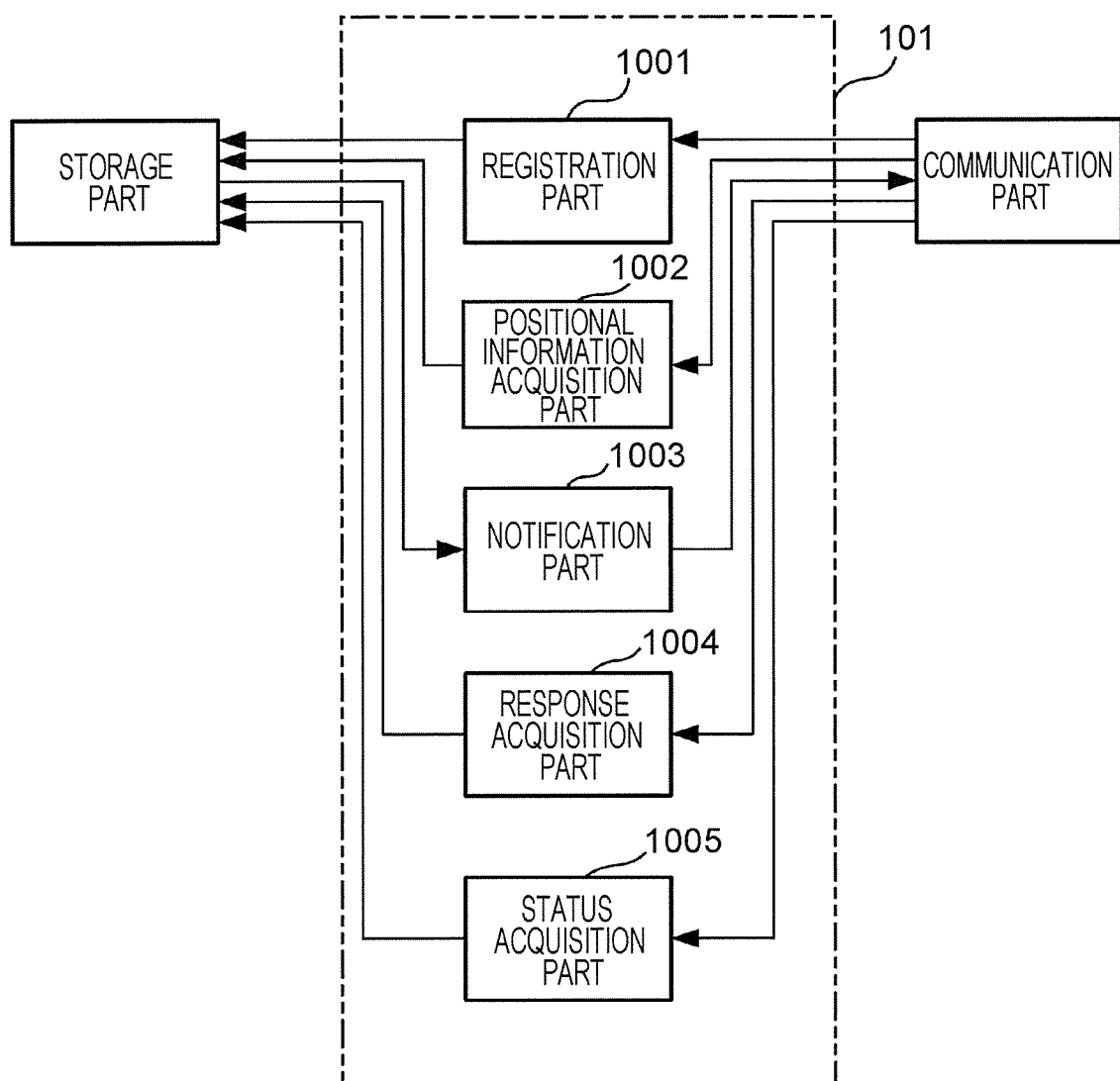
FIG. 5 is a functional block diagram of the notification apparatus.

FIG. 5 is a block diagram illustrating the configuration of the functions implemented through execution of the program by the control part 101. A registration part 1001 registers information related to a task in the task database DB1. The registration part 1001 stores, in the task database DB1, the information related to the task that is transmitted from the portable terminal 30. The registration part 1001 is an example of a registration unit according to the exemplary embodiment of the present disclosure. A positional information acquisition part 1002 acquires positional information of a user and stores the acquired positional information in the position database DB2. The positional information acquisition part 1002 is an example of a positional information acquisition unit according to the exemplary embodiment of the present disclosure. A notification part 1003 transmits a notification that recommends starting a task to a task participant when a positional relationship between task participants has become a predetermined positional relationship. The notification part 1003 is an example of a notification unit according to the exemplary embodiment of the present disclosure. A response acquisition part 1004 acquires a response to a notification transmitted to the portable terminal 30. The response acquisition part 1004 is an example of a response acquisition unit according to the exemplary embodiment of the present disclosure. A status acquisition part 1005 acquires information indicating a status of a task participant. The status acquisition part 1005 is an example of a status acquisition unit according to the exemplary embodiment of the present disclosure.

Operation Example of Exemplary Embodiment

Figure 6:
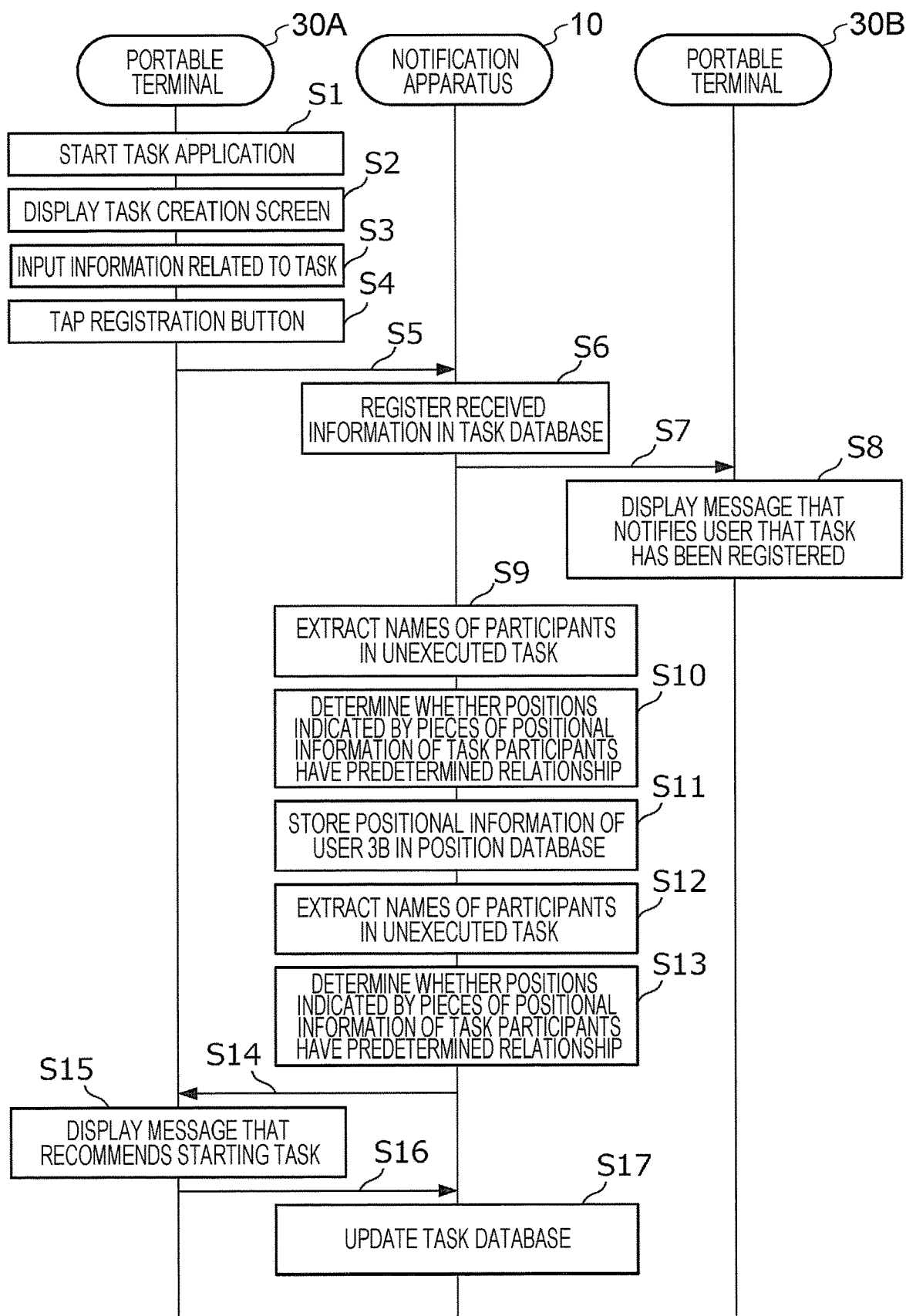
FIG. 6 is a sequence diagram for illustrating an operation example of the exemplary embodiment.

Next, an operation example of this exemplary embodiment is described. FIG. 6 is a sequence diagram for illustrating the operation example of the exemplary embodiment. When the user 3A intends to hold a meeting with, for example, the user 3B, the user 3A operates the portable terminal 30A to start the task application. In response to the user's operation, the portable terminal 30A starts the task application (Step S1). When the user 3A operates the portable terminal 30A to give an instruction to display a task creation screen after the task application has been started, the portable terminal 30A displays the task creation screen (Step S2).

FIG. 7 illustrates an example of the task creation screen. The user 3A inputs information related to a task to text boxes on the task creation screen (Step S3). Specifically, the user 3A inputs his/her name to a text box TB1 for inputting a task author and inputs the name of the user 3B who is a partner of the meeting to a text box TB2 for inputting a participant. The user 3A inputs a due date for completion of the meeting to a text box TB3 for inputting a due date, inputs an estimated time required for the meeting to a text box TB4 for inputting an estimated time, and inputs a message for the user 3B to a text box TB5 for inputting a message for a participant. When the user 3A who has finished inputting to each text box taps a registration button (Step S4), the portable terminal 30A transmits, to the notification apparatus 10, the author name, the participant name, the due date, the estimated time, and the message for the participant that are input to the respective text boxes (Step S5). The due date, the estimated time, and the message may be omitted.

The notification apparatus 10 receives the information transmitted from the portable terminal 30A in Step S5. The notification apparatus 10 (registration part 1001) that has received the information transmitted from the portable terminal 30A registers the received information in the task database DB1 (Step S6). Specifically, the notification apparatus 10 adds a new record to the task database DB1 and generates a task ID for identifying the task. The notification apparatus 10 stores the generated task ID in a task ID field of the added record. The notification apparatus 10 stores the received author name in an author field of the added record and stores the received participant name in a participant field of the added record. The notification apparatus 10 stores the received estimated time in an estimated time field of the added record, stores the received due date in a due date field of the added record, and stores the received message for the participant in a message field of the added record. The notification apparatus 10 stores information indicating "unexecuted" in a status field as a status of the task.

Next, the notification apparatus 10 transmits a notification including the received author name, the received estimated time, and the received message for the participant to the portable terminal 30B that is used by the user 3B who is the participant (Step S7). When the notification transmitted from the notification apparatus 10 is received, the portable terminal 30B displays a message that notifies the user 3B that the task involving the user 3B as the participant has been registered, together with the author name, the estimated time, and the message for the participant that are included in the received notification (Step S8). In this exemplary embodiment, the notification including the message for the participant is transmitted in Step S7 to the portable terminal 30B of the user 3B who is set as the task participant but need not be transmitted to the portable terminal 30B of the user 3B who is set as the task participant.

Next, the notification apparatus 10 searches for the record that stores the information indicating "unexecuted" in the status field and extracts the name stored in the author field and the name stored in the participant field as the names of task participants from the retrieved record (Step S9). Then, the notification apparatus 10 (notification part 1003) determines whether the positions indicated by pieces of positional information of the task participants have a predetermined relationship (Step S10). The notification apparatus 10 acquires positional information stored in association with the extracted author name and positional information stored in association with the extracted participant name. The notification apparatus 10 that has acquired the pieces of positional information determines whether the position indicated by the positional information of the task author and the position indicated by the positional information of the task participant have a predetermined relationship. Examples of the predetermined relationship include a relationship in which the position indicated by the positional information of the task author and the position indicated by the positional information of the task participant are the same room.

Figure 8:
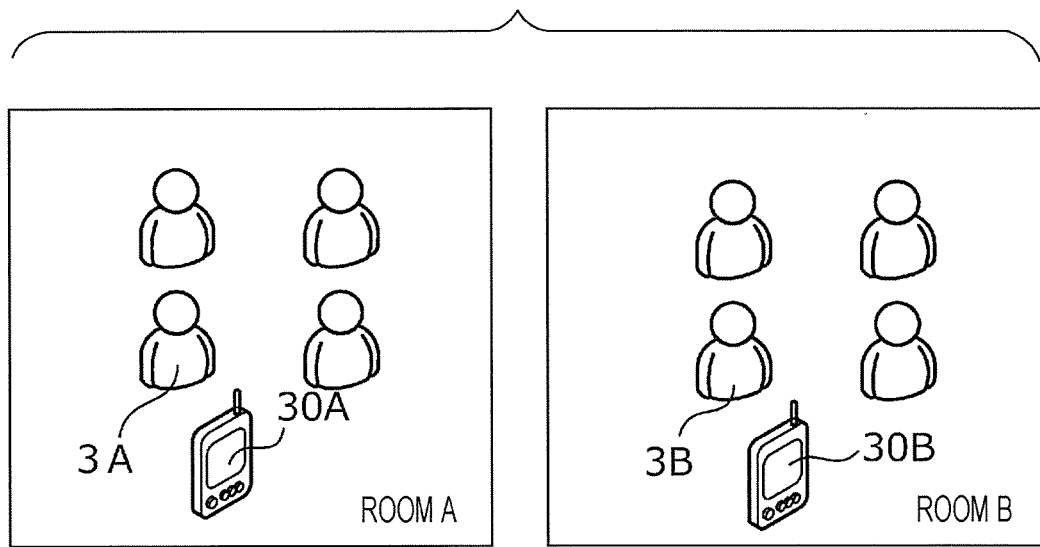
FIG. 8 illustrates an example of a positional relationship between task participants.
Figure 9:
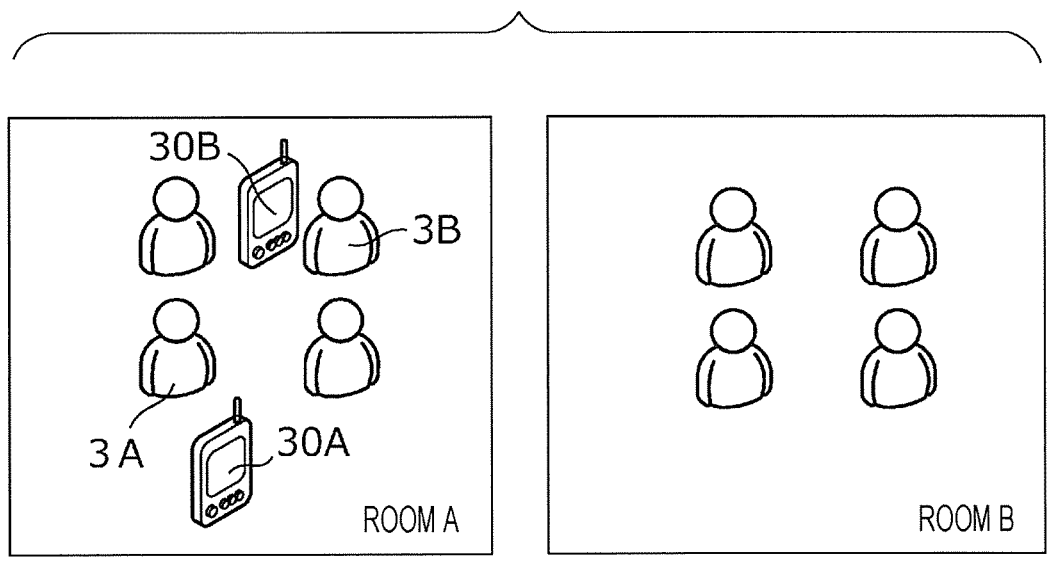
FIG. 9 illustrates an example of the positional relationship between the task participants.

FIG. 8 and FIG. 9 illustrate examples of the positional relationship between the task participants. When the user 3A who is the task author is located in a room A and the user 3B who is the task participant is located in a room B as exemplified in FIG. 8, the positional information of the user 3A indicates the room A and the positional information of the user 3B indicates the room B. In this case, the positions indicated by the pieces of positional information of the user 3A and the user 3B differ from each other and therefore the notification apparatus 10 determines that the positions indicated by the pieces of positional information of the task participants do not have the predetermined positional relationship. When it is determined that the positions indicated by the pieces of positional information of the task participants do not have the predetermined positional relationship, the notification apparatus 10 does not transmit the notification that recommends starting the task to the task participant.

When the user 3A who is the task author is located in the room A and the user 3B who is the task participant enters the room A as exemplified in FIG. 9, the notification apparatus 10 (positional information acquisition part 1002) acquires positional information of the user 3B that is transmitted from the room access control system and stores the acquired positional information in the position database DB2 in association with the name of the user 3B (Step S11).

When the position database DB2 is updated, the notification apparatus 10 searches for the record that stores the information indicating "unexecuted" in the status field and extracts the name stored in the author field and the name stored in the participant field as the names of task participants from the retrieved record (Step S12). The notification apparatus 10 acquires the positional information stored in association with the extracted author name and the positional information stored in association with the extracted participant name.

The notification apparatus 10 (notification part 1003) that has acquired the pieces of positional information determines whether the position indicated by the positional information of the task participant has the predetermined relationship (Step S13). The position indicated by the positional information of the user 3A who is the task author is the room A and the position indicated by the positional information of the user 3B who is the task participant is the room A and the positions indicated by the pieces of positional information of the user 3A and the user 3B are identical to each other. The notification apparatus 10 determines that the position of the user 3A and the position of the user 3B have the predetermined positional relationship.

Figure 10:
FIG. 10 illustrates an example of a screen displayed on a portable terminal.

When it is determined that the positions indicated by the pieces of positional information of the task participants have the predetermined positional relationship, the notification apparatus 10 (notification part 1003) transmits a notification that includes the task ID and the task participant name and recommends starting the task to the portable terminal 30A that is used by the user 3A who is the task author (Step S14). When the notification transmitted from the notification apparatus 10 is received, the portable terminal 30A displays the participant name included in the received notification and a message that recommends starting the task (Step S15). FIG. 10 illustrates an example of a screen displayed on the portable terminal 30A. With the displayed name and message, the user 3A grasps that the participant in the created task is located close to the user 3A. When the user 3A grasps that the participant in the created task is located close to the user 3A, the user 3A approaches the task participant to start the meeting with the user 3B.

When the meeting with the user 3B is finished, the user 3A taps an "EXECUTE" button on the screen exemplified in FIG. 10. When the "EXECUTE" button is tapped, the portable terminal 30A transmits, to the notification apparatus 10, a notification that includes the task ID included in the received notification and indicates that the task has been completed (Step S16). When the notification transmitted from the portable terminal 30A is received, the notification apparatus 10 searches the task database DB1 for the record that stores the task ID included in the received notification and updates the information in the status field of the retrieved record to information indicating that the task has been completed (Step S17).

As described above, according to this exemplary embodiment, even if the date and location are not set for the meeting of the participants about the task, the message that recommends starting the task is presented to the task participant when the task participants approach each other. With the message, the task participant grasps that another task participant is located close to the task participant and approaches the other task participant to execute the task.

Modified Examples

In the exemplary embodiment described above, the notification that recommends starting the task is transmitted to the portable terminal 30A of the user 3A who is the task author. The notification may be transmitted to the portable terminal 30A of the user 3A who is the task author and also to the portable terminal 30B of the user 3B who is the task participant.

In the exemplary embodiment of the present disclosure, priority levels may be set for the users and, when the notification that recommends starting the task is transmitted to the task participant, a transmission destination of the notification may be selected based on priority levels set for the participants. For example, when the task participants are the user 3A and the user 3B as in the exemplary embodiment described above and when the priority level set for the user 3B is higher than the priority level set for the user 3A, the notification that recommends starting the task may be transmitted to the user 3B having the higher priority level.

In the exemplary embodiment of the present disclosure, the notification apparatus 10 (status acquisition part 1005) may acquire pieces of information indicating the statuses of the users and, when the notification that recommends starting the task is transmitted to the task participant, select the transmission destination of the notification based on the statuses of the users.

For example, the notification apparatus 10 may acquire pieces of information on schedules of the users as the statuses of the users and transmit the notification that recommends starting the task to the user 3A or the user 3B who has a shorter period to the next schedule.

The portable terminal 30 may acquire heart rates as pieces of biological information of the users and transmit the heart rates to the notification apparatus 10 and the notification apparatus 10 may acquire the pieces of biological information as the statuses of the users. When the pieces of biological information of the users are acquired, the notification apparatus 10 may select the transmission destination of the notification that recommends starting the task based on heart rates of the task participants. For example, the user 3A or the user 3B who has a lower heart rate and is therefore resting may be set as the transmission destination of the notification that recommends starting the task.

The notification apparatus 10 may record elapsed times from update of positional information in the position database DB2 for the users and set, as the transmission destination of the notification that recommends starting the task, a user who has a shorter elapsed time from update of positional information. For example, when the user 3B enters the room A where the user 3A is present, the user 3B has a shorter elapsed time from update of positional information in the position database DB2. In this case, the notification apparatus 10 sets the user 3B as the transmission destination of the notification that recommends starting the task.

For example, the notification apparatus 10 may acquire pieces of information indicating operation statuses of the portable terminals 30 and select the transmission destination of the notification that recommends starting the task based on the acquired pieces of information. For example, when the notification apparatus 10 has acquired information on a sleep mode for the portable terminal 30A to indicate a non-operating state and information on "displaying" for the portable terminal 30B to indicate an operating state, the notification apparatus 10 may set the user 3B who is operating the portable terminal 30B as the transmission destination of the notification including the message that recommends starting the task.

In the exemplary embodiment of the present disclosure, it may be detected that the task participants are executing the task. Examples of the method for detecting that the task participants are executing the task include the following methods. It may be determined that the task participants are executing the task when the positions of the task participants are identical to each other over a predetermined time. It may be determined that the task participants are executing the task also when voice of conversation between the task participants is acquired on the portable terminals 30 carried by the participants.

When it is determined that the task participants are executing the task, the notification apparatus 10 may transmit, to the portable terminal 30 of the task participant, a notification that includes the task ID of the executed task and inquires whether the task has been completed. The portable terminal 30 that has received the notification displays a message that inquires whether the task has been completed and a GUI for reporting the completion of the task. When the task participant operates the GUI for reporting the completion of the task, the portable terminal 30 transmits, to the notification apparatus 10, a response that includes the task ID included in the received notification and reports the completion of the task and the notification apparatus 10 (response acquisition part 1004) receives the response that reports the completion of the task. The notification apparatus 10 may record, in the storage part 102, a history indicating the presence or absence of the response from the portable terminal 30 carried by the user notified of the inquiry of whether the task has been completed.

When the notification apparatus 10 (notification part 1003) records the history indicating the presence or absence of the response to the notification that inquires whether the task has been completed, the notification apparatus 10 may select the transmission destination of the notification that recommends starting the task based on the history indicating the presence or absence of the response. For example, when the task participants are the user 3A and the user 3B as in the exemplary embodiment described above, the notification including the message that recommends starting the task may be transmitted to a user who has a higher rate of the response to the notification.

In the exemplary embodiment of the present disclosure, one user may create a plurality of tasks. For example, the user 3A may create a task involving the user 3B as a partner of a meeting, a task involving the user 3C as a partner of a meeting, and a task involving the user 3D as a partner of a meeting. For example, when the users 3A to 3D are present in the same room and the positions indicated by the pieces of positional information of the users are identical to each other, any one of the plurality of tasks created by the user 3A may be selected and a notification that recommends starting the task may be transmitted to a participant in the selected task. In this modified example, the task author may set priority levels for the tasks. When a notification that recommends starting a task is transmitted, the notification apparatus 10 may select a task having the highest priority level among the plurality of created tasks and transmit the notification that recommends starting the task to a participant in the selected task. In this modified example, after a predetermined time has elapsed from the transmission of the notification that recommends starting the task, a notification that recommends starting another task may be transmitted.

In the exemplary embodiment of the present disclosure, a plurality of users may create tasks involving the same user as a participant. For example, in the exemplary embodiment of the present disclosure, the user 3A may create a task involving the user 3D as a partner of a meeting, the user 3B may create a task involving the user 3D as a partner of a meeting, and the user 3C may create a task involving the user 3D as a partner of a meeting. For example, when the users 3A to 3D are present in the same room and the positions indicated by the pieces of positional information of the users 3A to 3D are identical to each other, any one of the plurality of created tasks may be selected and a notification that recommends starting the task may be transmitted to a participant in the selected task.

When selecting a task, the notification apparatus 10 may select, for example, a task having the shortest period to its due date and transmit a notification that recommends starting the task to a participant in the selected task.

When selecting a task, the notification apparatus 10 may select any one task based on schedules of task participants and transmit a notification that recommends starting the task to a participant in the selected task. For example, the notification apparatus 10 may select a task whose participant is a user who has the shortest period to the next schedule among the user 3A to the user 3C and transmit a notification that recommends starting the task to the participant in the selected task.

Importance levels may be set for the tasks and, when selecting a task, the notification apparatus 10 may select a task having the highest importance level and transmit a notification that recommends starting the task to a participant in the selected task.

When a plurality of users have created tasks involving the same user as a participant and after a predetermined time has elapsed from transmission of a notification that recommends starting a task, a notification that recommends starting another task may be transmitted.

When a plurality of users have created tasks involving the same user as a participant, a task may be selected based on the statuses of the users described above and a notification that recommends starting the task may be transmitted to the participant in the selected task.

In the exemplary embodiment described above, the user 3A creates the task involving the user 3B as the participant. For example, the user 3A may create a task involving the user 3B and the user 3C as participants. When the participants in the created task are three or more persons including the author, a notification that recommends starting the task may be transmitted to the portable terminal 30 of any one of two participants whose positions have the predetermined relationship. When the participants in the created task are three or more persons and when the positional relationship among all the participants satisfies the predetermined relationship, the notification that recommends starting the task may be transmitted to all the participants. When the participants are three or more persons and when the notification that recommends starting the task is transmitted to any one of two participants, the transmission destination of the notification may be selected based on priority levels set for the participants. When the participants in the created task are three or more persons, a participant who definitely participates in the task may be set and the notification that recommends starting the task may be transmitted when the positional relationship between the participant who definitely participates in the task and the other participants satisfies the predetermined relationship.

In the exemplary embodiment of the present disclosure, when the positional relationship between the task author and the task participant has become the predetermined relationship, the notification apparatus 10 may transmit, to the portable terminal 30 of the user set as the task participant, a notification indicating that the task author is located close to the participant. In this modified example, the participant who has received the notification indicating that the task author is located close to the participant may set, on the portable terminal 30, whether the notification that recommends starting the task may be transmitted to the task author and transmit a setting result to the notification apparatus 10. When the setting result shows that the transmission is permitted, the notification apparatus 10 may transmit the notification that recommends starting the task to the portable terminal 30 of the task author. When the setting result shows that the transmission is not permitted, the notification apparatus 10 may transmit the notification that recommends starting the task to the portable terminal 30 of another participant without transmitting the notification to the portable terminal 30 of the task author.

In the exemplary embodiment of the present disclosure, the portable terminal 30 that has received the notification transmitted to the participant in Step S7 may set whether the notification that recommends starting the task may be transmitted to the task author and transmit a setting result to the notification apparatus 10. When the setting result shows that the transmission is permitted, the notification apparatus 10 may transmit the notification that recommends starting the task to the portable terminal 30 of the task author. When the setting result shows that the transmission is not permitted, the notification apparatus 10 may transmit the notification that recommends starting the task to the portable terminal 30 of the task participant without transmitting the notification to the portable terminal 30 of the task author.

In the exemplary embodiment described above, the room access information obtained by the room access control system is used as the positional information of the user but the configuration for acquiring the positional information of the user is not limited to the configuration of the exemplary embodiment. For example, in the exemplary embodiment of the present disclosure, the portable terminal 30 may have a function of measuring the position indoors and transmitting positional information indicating the measured position to the notification apparatus 10 and the notification apparatus 10 may store the positional information transmitted from the portable terminal 30 in the position database DB2. Examples of the method for measuring the position indoors include known methods such as a method that uses a base station of a wireless LAN and a method that uses a beacon.

The programs for the respective apparatuses according to the exemplary embodiment of the present disclosure may be installed by providing the programs stored in computer readable recording media such as a magnetic recording medium (such as a magnetic tape or a magnetic disk (hard disk drive (HDD) or flexible disk (FD))), an optical recording medium (such as an optical disc), a magneto-optical recording medium, and a semiconductor memory. The programs may be installed by downloading the programs via the communication line.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A notification apparatus, comprising:
    a communication interface circuit, coupled to an external device through a network;
    a storage apparatus, including a first database and a second database; and
    a processor, that:
        receives information transmitted from the external device through the communication interface circuit, wherein the information transmitted from the external device includes pieces of information related to work and pieces of information related to a plurality of participants of the work;
        registers the plurality of participants for the work in the first database based on the information transmitted from the external device;
        extracts participants of unexecuted work which is registered in the first database;
        acquires the pieces of positional information of the extracted participants from the second database;
        selects a participant to be notified out of the extracted participants;
        determines whether a positional relationship between the extracted participants is a predetermined positional relationship based on the pieces of positional information of the extracted participants; and
        notifies the selected participant, by transmitting notification to the selected participant through the communication interface circuit, when the positional relationship between the extracted participants is the predetermined positional relationship,
    wherein the processor acquires a response to notification from each of the extracted participants, records a history indicating the presence or absence of the response for each of the extracted participants in the storage apparatus, and determines the selected one participant based on the history.

2. The notification apparatus according to claim 1, wherein the processor selects the one participant to be notified based on priority levels set for the participants.

3. The notification apparatus according to claim 1, wherein the processor selects the one participant who has a higher rate of response than other participants to be notified based on the history.

4. The notification apparatus according to claim 1, wherein the processor further acquires pieces of information indicating statuses of the participants, and selects the one participant to be notified by using the statuses of the participants that are determined based on the pieces of information.

5. The notification apparatus according to claim 1, wherein, when one participant has the predetermined positional relationship with a plurality of participants and when the plurality of participants are participants in different types of work, the processor notifies at least one participant out of the one participant and the plurality of participants.

6. The notification apparatus according to claim 5, wherein the processor notifies a participant in work having a highest priority level among the different types of work in which the one participant and the plurality of participants participate.

7. The notification apparatus according to claim 6, wherein, after a predetermined time has elapsed from the notification, the processor gives a notification of work different from the work whose notification has been given.

8. The notification apparatus according to claim 1, wherein, when three or more participants participate in one type of work and when two participants out of the three or more participants have the predetermined positional relationship, the processor notifies one participant out of the two participants.

9. The notification apparatus according to claim 1, wherein the processor gives a notification that the participants have the predetermined positional relationship to a participant different from a participant who has registered work out of the participants.

10. The notification apparatus according to claim 9, wherein, when a predetermined response to the notification that the participants have the predetermined positional relationship is acquired, the processor notifies the participant who has registered the work.

11. The notification apparatus according to claim 9, wherein, when the notification is not permitted to the participant who has registered the work out of the participants, the processor notifies the participant different from the participant who has registered the work out of the participants.

12. A non-transitory computer readable medium storing a program causing a computer to execute a process comprising:
    receiving information that includes pieces of information related to work and pieces of information related to a plurality of participants of the work;
    registering the plurality of participants for the work;
    extracting participants of unexecuted work;
    acquiring the pieces of positional information of the extracted participants;
    selecting a participant to be notified out of the extracted participants;
    determining whether a positional relationship between the extracted participants is a predetermined positional relationship based on the pieces of positional information of the extracted participants; and
    notifying the selected participant when the positional relationship between the extracted participants is the predetermined positional relationship,
    wherein selecting the participant to be notified includes acquiring a response to notification from each of the extracted participants, recording a history indicating the presence or absence of the response for each of the extracted participants, and determining the selected one participant based on the history.

13. A notification apparatus, comprising:
    means for receiving information that includes pieces of information related to work and pieces of information related to a plurality of participants of the work;

registration means for registering the plurality of participants for the work;

means for extracting participants of unexecuted work;

positional information acquisition means for acquiring the pieces of positional information of the extracted participants;

means for selecting a participant to be notified out of the extracted participants;

means for determining whether a positional relationship between the extracted participants is a predetermined positional relationship based on the pieces of positional information of the extracted participants; and notification means for notifying the selected participant when the positional relationship between the extracted participants is the predetermined positional relationship, wherein the notification means acquires a response to notification from each of the extracted participants, records a history indicating the presence or absence of the response for each of the extracted participants in the storage apparatus, and determines the selected one participant based on the history.

\* \* \* \* \*